United States Patent
Lavoie

(10) Patent No.: US 10,000,207 B2
(45) Date of Patent: Jun. 19, 2018

(54) VEHICLE HITCH DETECTION SYSTEM AND METHOD

(71) Applicant: Ford Global Technologies, LLC, Dearborn, MI (US)

(72) Inventor: Erick Michael Lavoie, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days. days.

(21) Appl. No.: 15/186,850

(22) Filed: Jun. 20, 2016

(65) Prior Publication Data
US 2017/0361836 A1    Dec. 21, 2017

(51) Int. Cl.
| G06K 9/00 | (2006.01) |
|---|---|
| B60W 30/06 | (2006.01) |
| B60D 1/60 | (2006.01) |
| B60R 11/04 | (2006.01) |
| B60R 13/00 | (2006.01) |
| H04N 7/18 | (2006.01) |

(52) U.S. Cl.
CPC ............... B60W 30/06 (2013.01); B60D 1/60 (2013.01); B60R 11/04 (2013.01); B60R 13/00 (2013.01); G06K 9/00791 (2013.01); B60R 2300/307 (2013.01); B60W 2600/00 (2013.01)

(58) Field of Classification Search
USPC ....... 382/100, 103–107, 155, 162, 168, 173, 382/181, 209, 219, 232, 254, 274, 276, 382/286–291, 305, 312; 701/29.1, 25; 280/477; 340/425.5; 348/148
See application file for complete search history.

(56) References Cited

U.S. PATENT DOCUMENTS

| 6,120,052 | A | * | 9/2000 | Capik ..................... B60D 1/36 280/477 |
|---|---|---|---|---|
| 8,290,657 | B2 | | 10/2012 | Lavoie |
| 8,306,728 | B2 | | 11/2012 | Miller et al. |
| 8,427,288 | B2 | * | 4/2013 | Schofield ................ B60C 23/00 340/425.5 |
| 8,957,786 | B2 | | 2/2015 | Stempnik et al. |
| 9,061,629 | B2 | | 6/2015 | Miller et al. |
| 9,248,858 | B2 | | 2/2016 | Lavoie et al. |
| 2007/0182820 | A1 | * | 8/2007 | Wang ..................... B60R 1/003 348/148 |
| 2010/0039515 | A1 | * | 2/2010 | Dietz ..................... B60D 1/36 348/148 |
| 2012/0191285 | A1 | * | 7/2012 | Woolf ..................... B60D 1/36 701/25 |
| 2012/0229639 | A1 | | 9/2012 | Singleton |
| 2014/0058614 | A1 | * | 2/2014 | Trombley ................ B60R 1/00 701/29.1 |
| 2014/0229070 | A1 | | 8/2014 | Witting |
| 2015/0217693 | A1 | | 8/2015 | Pliefke et al. |

* cited by examiner

*Primary Examiner* — Seyed Azarian
(74) *Attorney, Agent, or Firm* — Frank MacKenzie; Price Heneveld LLP

(57) ABSTRACT

A vehicle hitch detection system is provided. The vehicle hitch detection system includes a camera arranged to capture images of a vehicle hitch and a controller processing the images to detect a powered hitch ornament connected to the hitch based on the processed images when an electrical hitch connection is detected. The controller may further control a driver assistance system based on the detected hitch ornament to enable or disable the system.

11 Claims, 4 Drawing Sheets

VEHICLE HITCH DETECTION SYSTEM AND METHOD

FIELD OF THE INVENTION

The present invention generally relates to driver assistance systems for vehicles, and more particularly relates to a vehicle hitch detection system useful for enhancing operation of a driver assistance system.

BACKGROUND OF THE INVENTION

Automotive vehicles are increasingly being equipped with driver assistance systems to assist the driver in maneuvering the vehicle. For example, active park assist (APA) systems assist the driver in parking the vehicle by sensing a parking location and controlling the steering system to steer the vehicle into the detected parking location. As another example, reverse park aid (RPA) systems warn a user when an object is detected behind the vehicle and may automatically apply brakes to avoid a collision with the detected object. Both RPA and APA systems typically are disabled when a trailer is connected to a towing hitch on the vehicle. When a trailer hitch ornament is attached to the hitch of the vehicle and the trailer electrical connector is connected to the powered hitch ornament, the APA and RPA driver assistance systems may be disabled upon detection of the electrical connection due to the assumption that a trailer is attached to the vehicle. It is desirable to provide for an enhanced driver assistance system that enables operation of the vehicle despite the presence of a powered hitch ornament.

SUMMARY OF THE INVENTION

According to one aspect of the present invention, a vehicle hitch detection system is provided. The system includes a camera arranged to capture images of a vehicle hitch, and an image processor processing the images to detect a powered hitch ornament connected to the hitch based on the processed images when an electrical hitch connection is detected.

According to another aspect of the present invention, a driver assistance system is provided. The system includes a camera arranged to capture images of a vehicle hitch, and an image processor processing the images to detect a powered hitch ornament connected to the hitch based on the processed images. The system also includes a controller controlling a driver assistance system based on the detected hitch ornament when an electrical hitch connection is detected.

According to a further aspect of the present invention, a method of detecting a hitch ornament connected to a vehicle hitch assembly. The method includes the steps of detecting an electrical hitch connector connected with the vehicle, capturing images of the hitch with a camera, and processing the images to detect a powered hitch ornament connected to the hitch when the electrical hitch connector is detected connected to the vehicle.

These and other aspects, objects, and features of the present invention will be understood and appreciated by those skilled in the art upon studying the following specification, claims, and appended drawings.

DETAILED DESCRIPTION OF THE PREFERRED EMBODIMENTS

For purposes of description herein, it is to be understood that the disclosed vehicle hitch detection system and the related methods may assume various alternative embodiments and orientations, except where expressly specified to the contrary. It is also to be understood that the specific devices and processes illustrated in the attached drawings, and described in the following specification, are simply exemplary embodiments of the inventive concepts defined in the appended claims. While various aspects of the vehicle hitch detection system and the related methods are described with reference to a particular illustrative embodiment, the disclosed invention is not limited to such embodiments, and additional modifications, applications, and embodiments may be implemented without departing from the disclosed invention. Hence, specific dimensions and other physical characteristics relating to the embodiments disclosed herein are not to be considered as limiting, unless the claims expressly state otherwise.

As used herein, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination.

Figure 1:
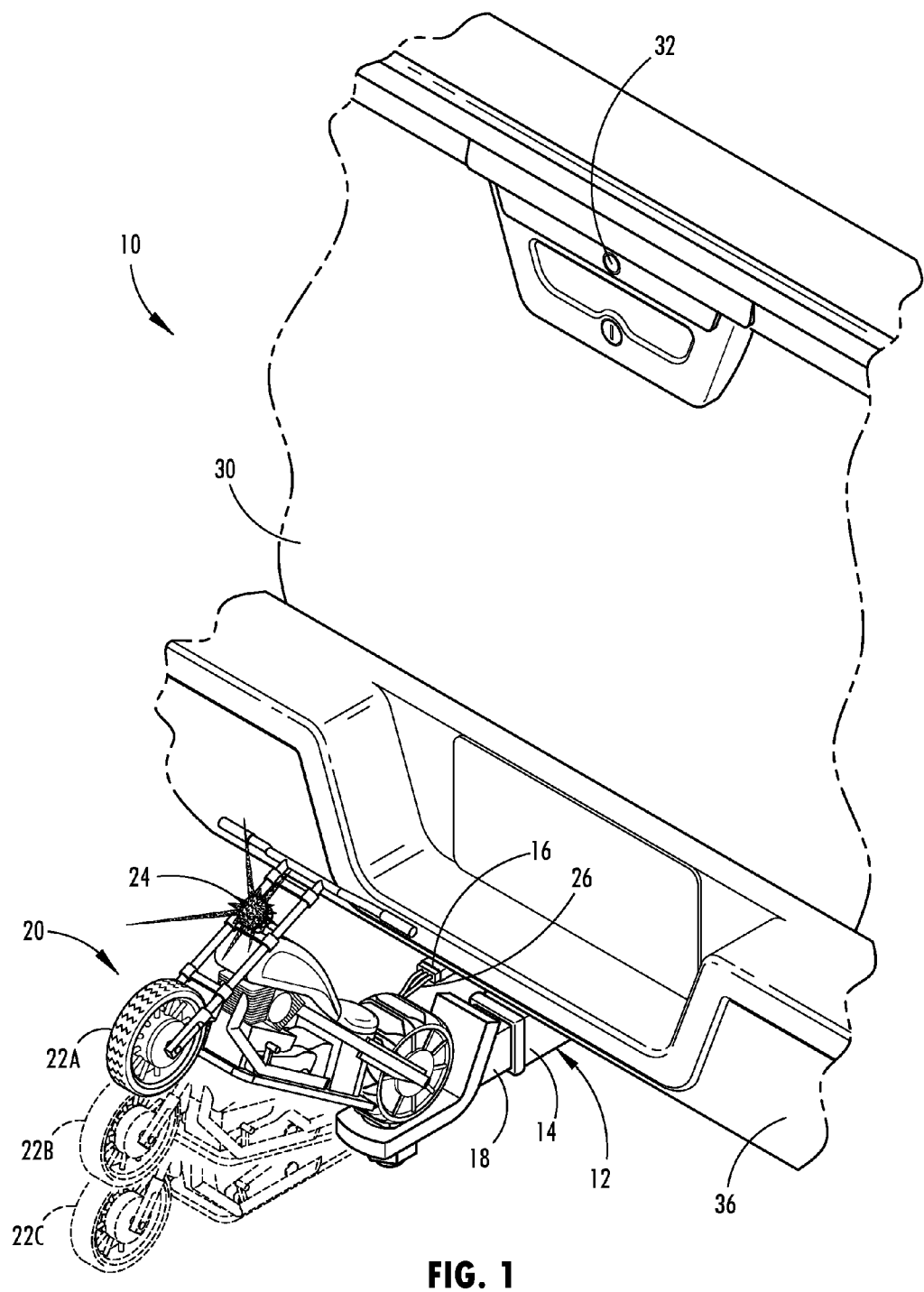
FIG. 1 is a rear perspective view of the rear end of a vehicle equipped with a hitch and a hitch detection system and further illustrating a powered hitch ornament attached to the hitch.
Figure 2:
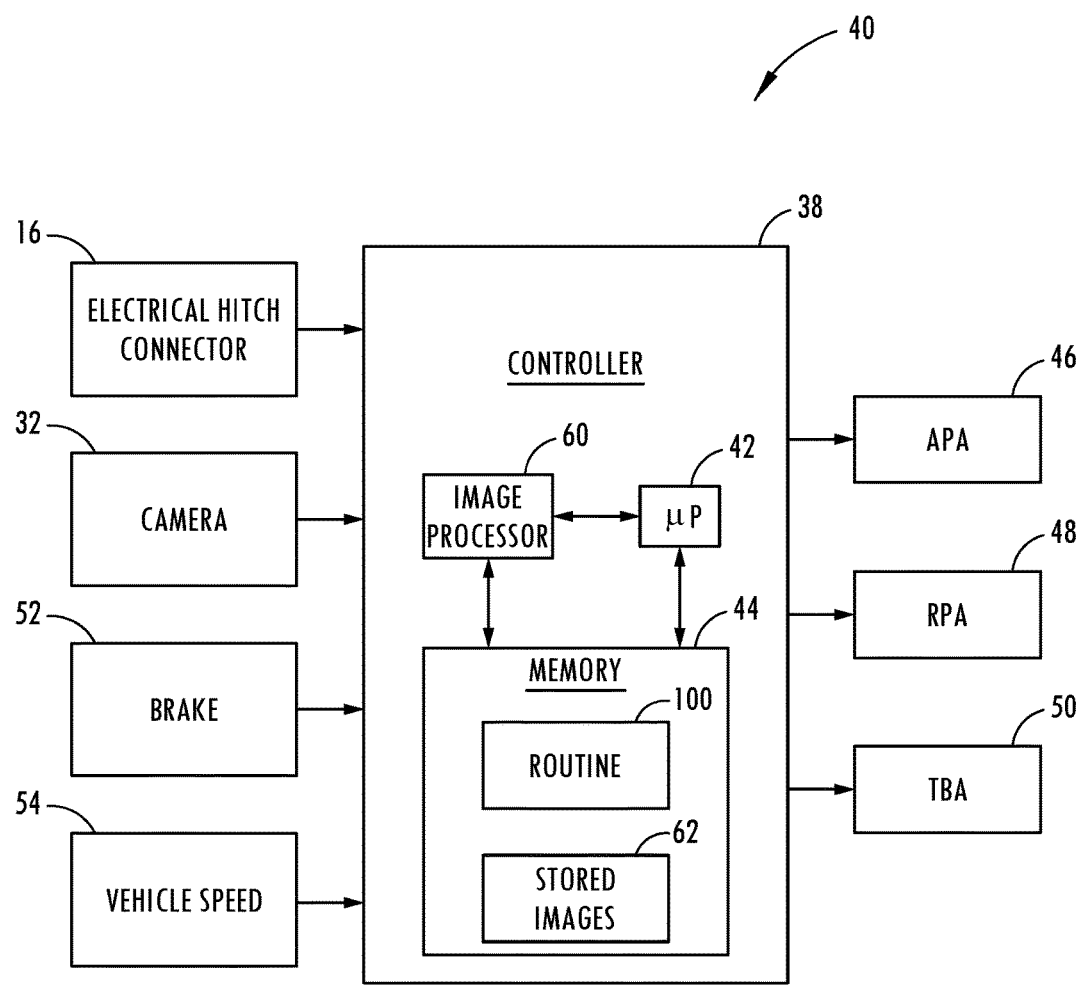
FIG. 2 is a block diagram illustrating the vehicle hitch detection system configured to control driver assistance systems, according to one embodiment.

Referring to FIG. 1, the rear end of a motor vehicle 10 in the form of a wheeled pickup truck is generally illustrated having a vehicle hitch detection system 40 which is shown in FIG. 2 for detecting an object in the form of a powered hitch ornament 20 connected to the vehicle tow hitch 12. The vehicle 10 shown and described herein has a vehicle tow hitch 12 mounted to the vehicle frame near the rear end of the vehicle 10 and extending rearward from the vehicle 10 below the rear bumper 36. The vehicle hitch 12 includes a hitch receiver 14 generally extending rearward from the vehicle 10. The hitch receiver 14 is configured to receive a hitch connector, such as a drawbar 18 which is fixedly attached with a locking pin. The drawbar 18 may be configured with a hitch ball configured to connect with the tow bar of a trailer that may be towed with the vehicle 10. A trailer typically has a trailer hitch connector in the form of a coupler assembly that may be connected to the hitch receiver ball on the drawbar. In addition, the hitch 12 includes an electrical connector 16 configured to connect with an electrical connector on a trailer or other connecting device such as a powered hitch ornament. The electrical connector 16 typically includes electrically powered contacts for supplying electrical power to power and control trailer lights, such as brake lights and turn signals, and may further include power to control trailer braking. When a trailer is connected to the vehicle hitch 12, the electrical connector on the trailer is connected via a plug in connector to the electrical connector 16 on the vehicle 10, such that the connectors are matingly engaged mechanically and electrically. The vehicle 10 may monitor the electrical connection as an indication that an electrically powered device such as a trailer or powered hitch connector is connected to the vehicle hitch 12.

The vehicle 10 is equipped with one or more driver assistance systems for assisting with the steering of the vehicle. The driver assistance systems may include an active park assist (APA) system 46. The APA system 46 may include APA sensors in the form of ultrasonic sensors that sense an available parking location. The APA system 46 may automatically steer the steering system of the vehicle to steer the vehicle into the parking assist location. Examples of APA systems are disclosed in U.S. Pat. Nos. 8,290,657 and 8,957,786, the entire disclosures of which are hereby incorporated herein by reference. In addition, the driver assistance systems may include a reverse park assist (RPA) system 48 which warns a user when an object is detected behind the vehicle and may further apply brakes to stop the vehicle to avoid a collision with an object. The RPA system 48 typically includes RPA sensors operatively connected to a controller, such as ultrasonic sensors. One example of an RPA system is disclosed in U.S. Pat. No. 8,306,728, the entire disclosure of which is hereby incorporated herein by reference. Further, the vehicle 10 may be equipped with a trailer backup assist (TBA) system 50 which may assist the vehicle in maneuvering a trailer connected to the vehicle while driving in reverse. One example of a TBA system is disclosed in U.S. Pat. No. 9,248,858, the entire disclosure of which is hereby incorporated herein by reference. It should be appreciated that other driver assistance systems such as blind spot information systems may be used.

The vehicle 10 is shown in FIG. 1 having a reverse imaging camera 32 arranged to capture images rearward of the vehicle 10 generally at the location where the hitch 12 and a hitch connection is made and may include the surrounding region where a hitch ornament or trailer would extend. The camera 32 may be part of a reverse camera system or a center high mount camera system as is known in the art. The camera 32 is shown located near the outer top edge of a tailgate for a pickup truck-type vehicle. However, it should be appreciated that the camera 32 may be located elsewhere on the vehicle 10 and on various types of vehicles to capture images of a trailer or hitch ornament connected to the hitch 12.

The reverse imaging camera 32 generates video image frames which are processed by an image processor and used to determine the presence of a powered hitch ornament connected to the vehicle hitch 12. The image processor may determine if a light is illuminating on the hitch ornament when there is an active trailer electrical connection made with the electrical connector 16 on the vehicle 10. If the hitch ornament is illuminated when there is an electrical connection, then the hitch ornament may be assumed to be a powered hitch ornament. If the hitch ornament light illumination is not detected, the system may also employ image blurring techniques to exploit the fact that the image frame pixels representing the background move relative to the camera while the video image pixels representing objects attached to the vehicle do not move relative to the camera. Further, the hitch detection system 40 may detect an animated hitch ornament when vehicle brakes are applied and thus, electrical power is supplied to the object connected to the vehicle hitch 12. This may achieved by monitoring the brake light state to help detect the hitch ornament and, if the brake lights are off and there is sufficient vehicle motion, the image blurring algorithm can conclude that there is a hitch ornament attached to the hitch 12.

A powered hitch ornament 20 is illustrated connected to the receiver 14 of the vehicle hitch 12 in FIG. 1. The powered hitch ornament 20 has a drawbar 18 which may be received within the receiver 14 to fixedly attach the hitch ornament 20 to the vehicle hitch 12. In addition, the powered hitch ornament 20 is electrically powered and has an electrical connector 26 configured to attach to the electrical connector 16 on the vehicle 10 to receive electrical power to power the powered hitch ornament 20. The powered hitch ornament 20 is further illustrated having a light device 24 that may be illuminated when the electrical connector 26 is connected to the hitch connector 16 and the vehicle brakes are applied which cause electrical power to be supplied to the hitch ornament 20. In addition, the powered hitch ornament 20 is shown as an animated hitch ornament that moves on the drawbar 18 amongst a plurality of positions as shown by positions 22A, 22B and 22C, when the vehicle brake is applied. As such, when the vehicle brake is applied, the powered hitch ornament 20 is powered with electrical current from the vehicle battery via the hitch connector 16 to activate the light device 24 and an actuator (e.g., motor) that moves that animated device on the drawbar 18 of the hitch ornament. The camera 32 captures images of the powered hitch ornament 20 and a processor may detect the presence of the illuminated light device 24 and the movement of the animated hitch ornament 20 when the vehicle brakes are applied to determine that a powered hitch ornament is attached to the vehicle hitch 12.

The vehicle 10 is equipped with a vehicle hitch detection system 40 which detects the presence of a powered hitch ornament 20 connected to the vehicle hitch 12 and controls one or more of the driver assistance systems 46, 48 and 50 based on the detected powered hitch ornament 20. The vehicle hitch detection system 40 is shown in FIG. 2 having a controller 38 receiving various inputs and providing outputs to three driver assistance systems including the APA 46, RPA 48 and TBA 50. The controller 30 may include a microprocessor 48 and memory 44. A routine 100 for detecting a hitch ornament and controlling the driver assistance systems is shown provided within memory 44 and executable by the microprocessor 42. In addition, the controller is shown having an image processor 60 for processing the video image frames generated by the camera 32. The image processor 60 may be separate from or integrated with the microprocessor 42. Also shown in memory 44 are stored images 62 which are used as reference images to be compared with processed images to detect a hitch ornament. The controller 38 may include other analog and/or digital control circuitry. Controller 38 may be a dedicated controller or may be a shared controller associated with one or more of the driver assistance systems or the vehicle body controller, for example.

The controller 38 receives various inputs including an input from the electrical hitch connector 16 on vehicle 10 indicative of whether a hitch connector is electrically connected to the vehicle hitch connector 16. Additionally, the controller 38 receives captured images acquired by the rearview camera 32 located at the rear of the vehicle and oriented to capture images rearward of the vehicle generally in the vicinity of the vehicle hitch 12. The image processor 60 of controller 38 processes the video frames of the images and compares the frames to reference images to detect the presence of a powered hitch ornament. In addition, the controller 38 receives a brake signal from the vehicle brake system 52 and a vehicle speed signal from a vehicle speed indicator 54. The controller 38 processes the various inputs pursuant to control routine 100 to detect the presence of a powered hitch ornament and controls one or more of the driver assistance systems 46, 48 and 50 based on the detected powered hitch ornament. The controller 38 may communicate with the driver assistance systems 46, 48 and 50 by broadcasting a CAN signal on the vehicle communication network indicating the detected processor of a powered hitch ornament.

When a powered hitch ornament 20 is detected connected to the vehicle hitch 12, the controller 38 upon determining that the hitch 12 is connected to a powered hitch ornament 20, enables operation of the APA and RPA systems 46 and 48. In contrast, when the hitch electrical connector 16 is connected to another connector and a trailer is detected connected to the hitch 12, the APA and RPA systems 46 and 48 are disabled. Since the powered hitch ornament 20 is an object that is fixedly connected to the hitch receiver 14 as opposed to a pivoting trailer, the vehicle 10 is enabled to operate in either the APA or RPA modes. In addition, the controller 38 may disengage operation of the TBA system 50 when a powered hitch ornament 20 is detected connected to the hitch 12 since the object is not an articulating trailer. It should be appreciated that other driver assistance systems may be controlled based on detection of a powered hitch ornament or a trailer. For example, a blind spot information system may change the blind spot detection of a trailer is detected.

Figure 3A:
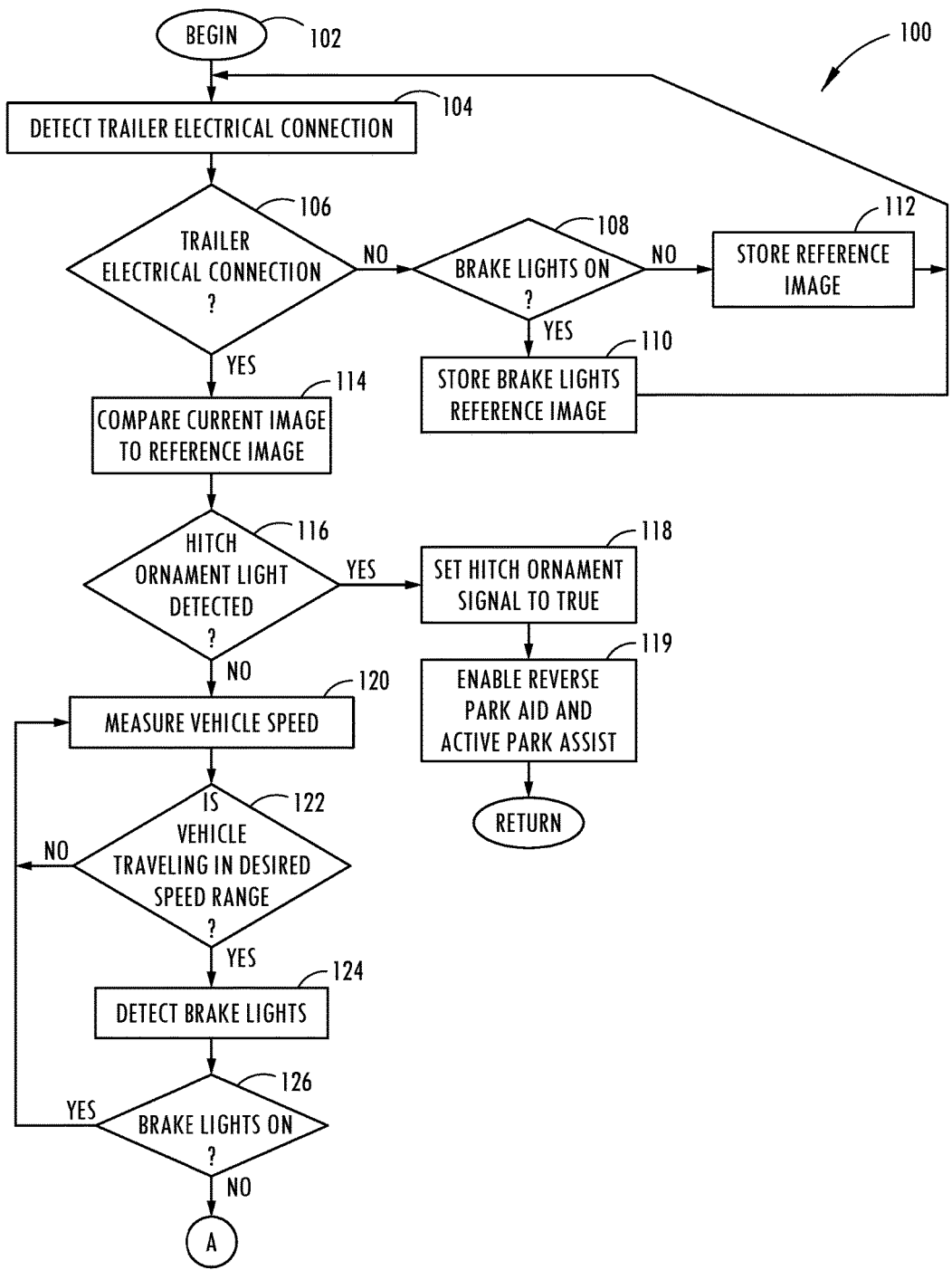
FIGS. 3A and 3B are a flow diagram illustrating a routine for detecting a hitch ornament connected to the vehicle and controlling the driver assistance systems, according to one embodiment.
Figure 3B:
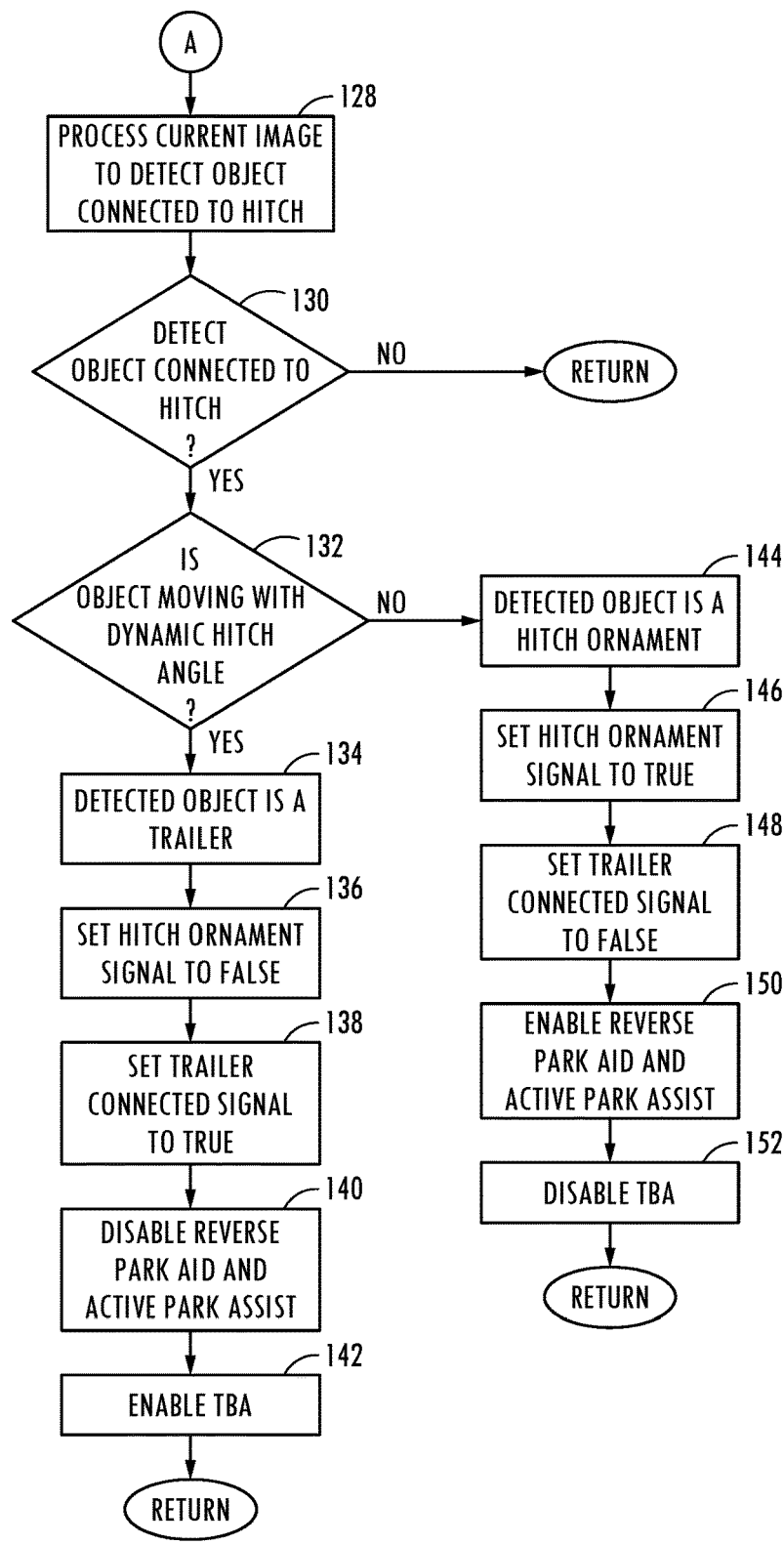

Referring to FIG. 3, the routine 100 for detecting a hitch ornament connected to a vehicle hitch assembly and controlling one or more of the driver assistance systems is illustrated, according to one embodiment. Routine 100 begins at step 102 and proceeds to step 104 to detect a trailer electrical connection when an electrical connector is connected to the vehicle hitch connector. This may be achieved by detecting electrical continuity or current flow through the connection. At decision step 106, the routine 100 determines if the trailer electrical connection has been detected. If no trailer electrical connection is detected, routine 100 proceeds to decision step 108 to determine if the vehicle brake lights are on and, if not, stores a reference image in memory before returning to step 104. If the vehicle brake lights are detected to be on, routine 100 proceeds to step 110 to store the brake lights reference image in memory before returning to step 104. As such, captured reference images when there is no trailer electrical connection both when the brakes are on and off may be stored in memory and used as a reference image by the routine 100 to compare with subsequently captured video images.

If a trailer connection is detected at step 106, routine 100 proceeds to step 114 to compare the current video image to the reference image(s). At decision step 116, routine 100 determines if the hitch ornament light is detected and, if so, sets the hitch ornament signal flag to true at step 118. As such, routine 100 determines that a powered hitch ornament that has an illuminated light is connected to the vehicle hitch and sets the hitch ornament flag to true. With the hitch ornament signal flag set to true, the reverse park aid and reverse park aid systems are enabled in step 119. Thereafter, routine 100 returns to the beginning.

If a hitch ornament light has not been detected at step 116, routine 100 proceeds to step 120 to measure the vehicle speed. Next, at decision step 122, routine 100 determines whether the vehicle is traveling in a desired speed range and, if not, returns to step 120. Step 122 may determine if the vehicle is traveling in the desired speed range of 1 km/hr or more, according to one embodiment. By requiring vehicle speed, the images can be processed to detect objects fixed to the vehicle relative to the ground which shows up as blurred images. If the vehicle is traveling in the desired speed range, routine 100 proceeds to step 124 to detect the vehicle brake light. Next, at decision step 126, routine 100 determines if the vehicle brake lights are on and, if the brake lights are on, returns to step 120. If the vehicle brake lights are not detected on, routine 100 proceeds to the following steps to detect a hitch ornament and perform the following functions. This includes step 128 of processing the current image to detect an object connected to the vehicle hitch. This may be achieved with the image processor processing the captured video image frames and comparing the image frames to stored images to identify the presence of an object attached to the vehicle hitch. Next, at decision step 130, routine 100 determines if an object is detected connected to the hitch and, if not, returns to the beginning. If an object is detected connected to the vehicle hitch, then routine 100 proceeds to decision step 132 to determine if the object is moving with a dynamic hitch angle. An object is determined moving with a dynamic hitch angle if the object is moving laterally with respect to the vehicle hitch, such that the object may be pivoting or articulating about the hitch. If the object is detected moving dynamically with a hitch angle, routine 100 determines that the detected object is a trailer that is pivotally connected to the vehicle hitch at step 134. When the object is determined to be a trailer, routine 100 proceeds to step 136 to set the hitch ornament signal flag to false and then to step 138 to set the trailer connected signal flag to true. Thereafter, routine 100 proceeds to step 140 to disable the reverse park aid and active park assist systems. In addition, routine 100 enables the trailer backup assist system at step 142 before returning to the beginning.

If an object is not detected moving with a dynamic hitch angle in step 132, routine 100 proceeds to step 144 to determine if the detected object is a hitch ornament. When this occurs, routine 100 proceeds to step 146 to set the hitch ornament signal flag to true and then step 148 to set the trailer connected signal to false. In addition, the reverse park aid and active park assist systems are enabled at step 150 and the trailer backup assist system is disabled at step 152. Thereafter, routine 100 returns to the beginning.

Accordingly, routine 100 detects when a hitch ornament is connected to the vehicle and enables operation of the reverse park aid and active park assist driver assistance system and disables the trailer backup assist driver assistance system since the detected hitch connection is a hitch ornament as opposed to a pivotal trailer. When a device is connected to the hitch and is determined not to be a hitch ornament, the system disables the reverse park aid and active park assist systems and enables the trailer backup assist system to operate since the detected object is presumed to be a trailer.

It is to be understood that variations and modifications can be made on the aforementioned structure without departing from the concepts of the present invention, and further it is to be understood that such concepts are intended to be covered by the following claims unless these claims by their language expressly state otherwise.

What is claimed is:

1. A vehicle hitch detection system comprising:
  a camera arranged to capture images of a vehicle hitch;
  an image processor processing the images to detect a powered hitch ornament connected to the hitch based on an illuminated hitch ornament light detected in the processed images when an electrical hitch connection is detected; and control circuitry comprising a microprocessor and memory configured to enable or disable a driver assistance system based on the detected hitch ornament, wherein the driver assistance system comprises at least one of an active park assist system and a reverse park aid system which is enabled when a powered hitch ornament is detected, and wherein the driver assistance system further comprises a trailer backup assist system that is disabled when the hitch ornament is detected.

2. The detection system claim 1, wherein the processor detects a powered hitch ornament when the vehicle brakes are applied.

3. The detection system of claim 1, wherein the processor detects an object connected to the hitch and determines the object is a powered hitch ornament when the object is not moving with a dynamic hitch angle.

4. The detection system of claim 1, wherein the processor detects a powered hitch ornament based on at least one of a detected illuminated hitch ornament light and movement.

5. A driver assistance system comprising:
a camera arranged to capture images of a vehicle hitch;
an image processor processing the images to detect a powered hitch ornament connected to the hitch based on an illuminated hitch ornament light detected or movement of an object in the processed images; and
control circuitry comprising a microprocessor and memory configured to enable or disable the driver assistance system based on the detected hitch ornament when an electrical hitch connection is detected, wherein the driver assistance system comprises at least one of an active park assist system and a reverse park aid system which is enabled when a powered hitch ornament is detected and wherein the driver assistance system further comprises a trailer backup assist system that is disabled when the hitch ornament is detected.

6. The system of claim 5, wherein the processor detects a powered hitch ornament when the vehicle brakes are applied.

7. The system of claim 5, wherein the processor detects an object connected to the hitch and determines the object is a powered hitch ornament when the object is not moving with a dynamic hitch angle.

8. A method of detecting a hitch ornament connected to a vehicle hitch assembly comprising:
detecting an electrical hitch connector connected with the vehicle;
capturing images of the hitch with a camera;
processing the images with a processor to detect a powered hitch ornament connected to the hitch based on an illuminated hitch ornament detected when the electrical hitch connector is detected connected to the vehicle; and
controlling with control circuitry comprising a microprocessor and memory a driver assistance system to enable or disable the driver assistance system based on the detected hitch ornament, wherein the driver assistance system comprises at least one of an active park assist system and a reverse park aid system which is enabled when a powered hitch ornament is detected, and wherein the driver assistance system further comprises a trailer backup assist system that is disabled when the hitch ornament is detected.

9. The method of claim 8, wherein the processor detects a powered hitch ornament when the vehicle brakes are applied.

10. The method of claim 8, wherein the processor detects an object connected to the hitch and determines the object is a powered hitch ornament when the object is not moving with a dynamic hitch angle.

11. The method of claim 8, wherein the processor detects a powered hitch ornament based on at least one of a detected illuminated hitch ornament light and movement.

\* \* \* \* \*